INVENTOR.
JOHN B. CATALDO
BY
Campbell, Brumbaugh, Free & Graves
HIS ATTORNEYS

INVENTOR.
JOHN B. CATALDO
BY Campbell, Brumbaugh, Free & Graves
HIS ATTORNEYS

Patented Feb. 3, 1953

2,627,562

UNITED STATES PATENT OFFICE 2,627,562

TWO-WIRE SEQUENCE RELAY

John B. Cataldo, Bernardsville, N. J., assignor to John B. Pierce Foundation, New York, N. Y., a corporation of New York Application January 31, 1950, Serial No. 141,529

9 Claims. (Cl. 200—87)

This invention relates to electrical relays and particularly to sequence-type relays adapted to be energized by two-wire control circuits to perform, by intermittent steps, a given sequence of operations comprising a complete duty cycle.

The use of relays as a means for lowering the installation and initial equipment cost of electrical systems, such for example as household or industrial wiring systems, is dependent upon the development of low cost relays of small size, offering faultless mechanical and electrical operation throughout their service lives and requiring a minimum number of conductors in their control circuits. Moreover, satisfactory operation of such systems requires that relatively little power be required for controlling the relay action. In this respect movement of the relay linkages should be free of unnecessary friction and armature biasing or return springs, where such are required, should be of the lightest possible construction consistent with effective armature return motion.

It is accordingly an object of the invention to provide a sequence relay adapted to be remotely controlled through low-voltage circuits including only one switch, which may be of the single-pole single-throw momentary push type, at any given control station, thereby to simplify the wiring and installation cost for the reason that no more than two low power capacity control leads need be provided in such systems.

It is another object of the invention to provide a relay susceptible of operation in a two-wire circuit and responsive to low-voltage control for performing a sequence of spaced work-operations such as first opening a power circuit and subsequently closing the circuit, and which utilizes simplified, highly effective mechanical linkages.

It is another object of the invention to provide a relay of the single-coil, two-wire type furnished with a mechanical linkage utilizing the locking effect of a snap disc as well as its snap action.

It is a further object of the invention to provide a sequence-type relay energized from a simplified two-wire control circuit and which provides a positive driving movement for each control or work action of those of the sequence offered.

The foregoing and other objects are attained by providing a single coil relay susceptible of energization by a two-wire control circuit, which relay includes a movable core portion or armature supported in a novel guide-bearing assembly occupying minimum overall space and nevertheless providing an efficient flux path for insuring rapid and strong relay action.

According to this invention a relay adapted for operation in a two-wire circuit is provided which includes novel mechanical linkage to convert one complete reciprocation of the armature (such as might be caused by one energization of the relay coil), into a first unidirectional movement of a work arm and, upon a second energization, to convert the reciprocatory movement of the armature into movement of the work arm in the opposite direction to complete a duty cycle of the relay. This is accomplished by a ratchet wheel and an eccentric pin or crank disposed between the armature and the work arm, which may operate in conjunction with a snap disc operatively connected thereto. The armature is preferably spring-biased so that after each momentary energization of the relay, during which the throw-arm performs a work operation such as actuating the snap disc, it is returned to a given inoperative position to complete one reciprocation. The return stroke is accomplished without again reversing the point of equilibrium of the snap disc, but nevertheless prepares the relay linkage in a manner to be disclosed for the next work operation in the sequence. In this manner all work-control action of the relay is positive in its nature and in direct response to electromagnetic energization of the relay, rather than dependent wholly upon energy stored in the armature return spring.

The above and other objects of the invention will be better understood from the following detailed description of a preferred embodiment thereof taken in conjunction with the accompanying drawings in which:

Fig. 1 is a view in longitudinal section of a relay constructed according to the invention, taken through the center-line thereof and showing the relay in its deenergized state;

Fig. 2 is an enlarged view of a portion of the mechanical linkage of the relay shown in Fig. 1;

Fig. 3 is a developed plan view of certain disassembled components of the mechanical linkage;

Fig. 4 is a view in cross-section taken along the line 4—4 of Fig. 1 and looking in the direction of the arrows;

Figure 5:
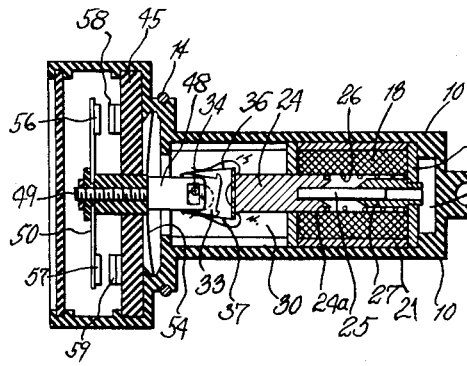
Fig. 5 is a view in cross-section taken along the center-line of the deenergized relay as seen from a position 90° from that of Fig. 1.
Figure 7:
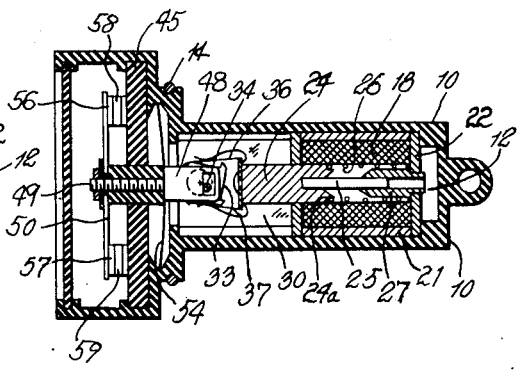
Figure 6:
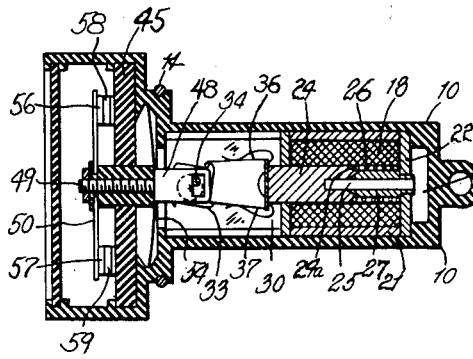
Fig. 6 is a view, similar to that of Fig. 5, showing the relay momentarily energized and with one operation of its duty cycle having been performed.
Figure 8:
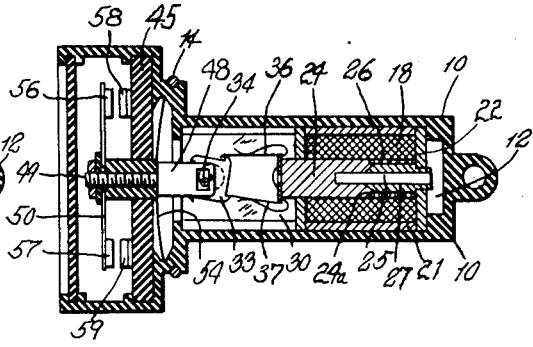

Fig. 7 is a view similar to Fig. 5 showing the relay after deenergization and in which the mechanical linkage has prepared itself so that subsequent energization of the relay results in per- Within the enlarged contact chamber 13, a wall or panel 45 is mounted, this wall being formed with a square aperture 46 within which a contact post of square cross-section 47 is slidably received to be constrained against turning. The wall and post are preferably formed of insulating material, and reciprocation of the post is accomplished by means of a throw arm or plate 48 having a threaded extension 49 onto which is screwed the post 47. An electrical shorting bar or contact carrier 50 is fitted over the extension 49 and an insulating bushing 51, formed with a hub 51a for isolating the electrical shorting bar 50 from the threaded extension 49, is secured on the extension 49 by a nut 52. The right-hand end of the throw arm 48 is formed with an enlarged slot 53 within which the eccentric pin 34 is received, as illustrated in Figures 1 and 2. In this fashion, rotation of the ratchet wheel 33 causes reciprocation of the throw arm 48 and a corresponding movement of the contact member 50. The length of the slot is such that 90 degrees of revolution of the crank pin 34 may be lost without transmitting movement to the throw arm 48.

The throw arm 48 and associated parts are biased in either of two extreme positions by means of a snap disc spring 54, the rim of which is secured in a circular groove 55 that is formed within the chamber 13, the central portion of the disc being loosely embraced between opposing ends of the throw arm 48 and the post 47. The disc is capable of assuming either of two positions of equilibrium as illustrated in Figures 5 and 7, and should be calibrated to match the characteristics of the relay. The enlarged slot 53 permits sufficient lost motion between the throw arm 48 and the ratchet wheel 33 to enable the snap disc 54 to complete its movement from its point of initial throw to its final position of repose. Thus the total excursion of the throw arm 48 may exceed the throw of the plunger 24. The final positions of repose, as illustrated in Figures 5 and 7 are such that the shorting bar 50 is maintained in either an opened or closed position, as described below.

The ends of the shorting bar 50 carry movable contacts 56 and 57 which are adapted to engage respectively stationary contacts 58 and 59 mounted respectively on contact plates 60 and 61 that are carried by the panel or plate 45 (Figure 9). Wires 62 and 63 are connected respectively to the contact plates 60 and 61 and form a part of the power circuit that is to be controlled by the relay.

One preferred manner in which the relay is utilized is illustrated in the diagrammatic sketch of Figure 10, wherein a secondary coil of a transformer or other source of low voltage supply as illustrated at 64, is connected in a circuit including the low voltage wires 19 and 20. One or more momentary push switches 65 may be connected across the wires 19 and 20 in order that the relay may be controlled from one or more points. In this fashion, the main, relatively high voltage circuit of which wires 62 and 63 form a part may be effectively controlled from the remote positions of the switches 65.

The operation of the relay above described involves a work cycle which is illustrated in Figures 5, 6, 7 and 8. With the relay contacts open, as illustrated in Figure 5, energization of the solenoid 18 moves them into the closed position illustrated in Figure 6 by reversing the point of equilibrium of the snap disc 54. The movement of the plunger 24 is transmitted to the contact members through the pulling pawl 36 as will be readily apparent from the description hereinabove given, and upon deenergization of the solenoid, the spring 26 returns the plunger to its normal inoperative position, as illustrated in Figure 7. This return movement causes the pushing pawl 37 to advance the ratchet wheel 33 through an additional ninety degrees to move the pin 34 into the position illustrated in Figure 7, at which time further rotation of the ratchet wheel 33 will advance the throw arm 48 to the left. Thus, when the solenoid is again energized, movement of the plunger to the right will cause further clockwise movement of the ratchet wheel, and the pin 34 will move the contacts into the open position of Fig. 8, the snap spring 54 serving, in each movement of the throw arm 48, to complete the movement thereof and maintain the plate and contacts in either the opened or closed position. The orientation of the crank pin 34 within the slot 53 of the throw arm 48 is such that movement of the snap disc 54, and hence movement of the contacts, is effected only upon energization of the relay coil, with the return stroke as caused by the coil spring 26 being utilized only to prepare the linkage for the next work stroke.

Figure 11:
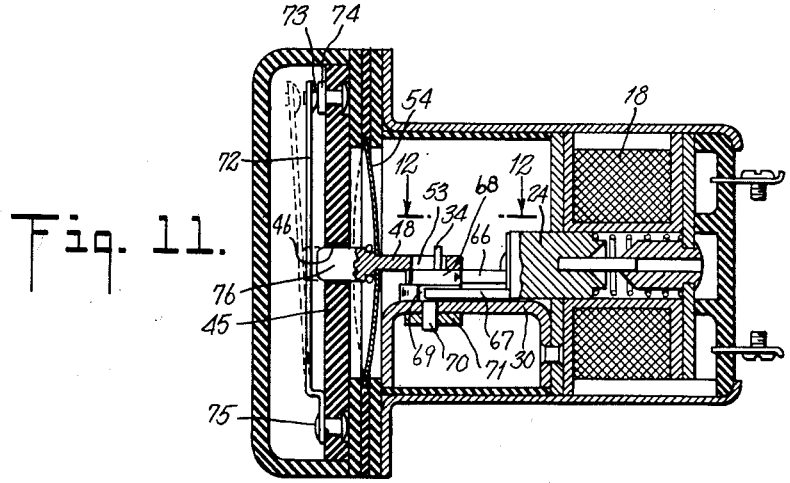
Figure 12:
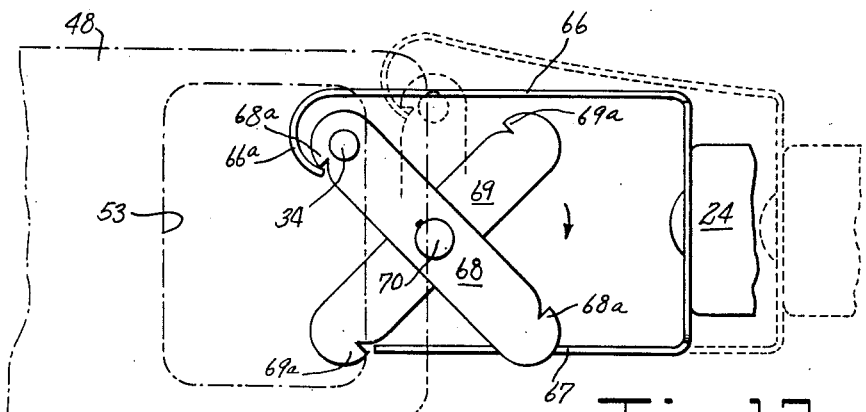
Figure 13:
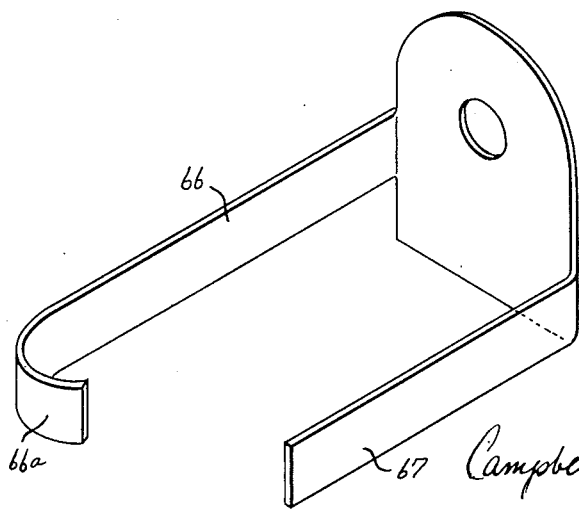

In order to further decrease the frictional drag on the plunger 24 as well as to prevent possible cycling errors wherein the ratchet wheel becomes 90° out of step with the relay action, a modification of certain parts of the relay is provided as shown in Figs. 11 to 13. Basically the relay is similar to that described above with reference to Figs. 1 to 8, with like components in the modified assembly being assigned like reference characters.

In the modified relay, spaced pawls 66 and 67, hereinafter termed pulling- and pushing-pawls, respectively, are affixed to the inner end of the plunger 24 in edgewise offset relationship, i. e., spaced with respect to the axis of rotation of the ratchet wheel as shown in Figs. 11 and 13. The pawls are adapted upon reciprocation of the plunnger to rotate a ratchet wheel assembly, which is formed of two crossed legs 68 and 69 laterally offset so that a hook-end 66a of the pulling-pawl 66 may exclusively and sequentially engage the toothed tips 68a of the leg 68, and straight end 67a of the pushing-pawl 67 the toothed tips 69a of the leg 69.

The crossed legs 68 and 69 are centrally secured to a hub pin 70 rotatably received in the apertured shelf 30 and having a washer 71 mounted on its free end to complete the assembly.

In operation as the plunger is drawn into the coil 18, pulling-pawl 66 engages a tooth 68a of the leg 68 thereby to rotate the ratchet wheel assembly 90°. As the leg 68 is rotated through the midpoint of its 90° movement as shown in broken lines in Fig. 12 the pawl 66 will be bent outwardly in compliance therewith, whereas the pushing-pawl 67, because it is laterally offset from the leg 68 will not be biased from its initial alignment. At the top of the plunger stroke the pushing-pawl 67 will come into engagement with a tooth 69a of the leg 69 so that on the down or reverse stroke of the plunger the ratchet wheel assembly is rotated an additional 90°. On the latter cycle the pulling-pawl 66, because it is laterally offset from the driven leg 69 will not be bent outwardly as it was in the pulling stroke.

It will be apparent, therefore, that the frictional load on the plunger element 24 is materially decreased because one pawl rides substantially free of the ratchet wheel at all times. Moreover, because it is impossible for the pulling-pawl 66 ever to engage the teeth 69a of the leg 69, the ratchet wheel cannot become 90° out of step.

Also shown in Fig. 11 is a modified contact assembly whereby electrically conducting contact carrier arm 72 is completely disengaged from its actuating assembly when contacts 73 and 74 of the power circuit are closed. This is made possible by forming the contact carrier 72 of resilient material and securing it at its terminal end 75 to the shelf member 45 so that it is self-biased toward the contact-closed position. A push rod 76, slidably received in the bore 46 of the shelf 45, is secured to the central or moving portion of the snap disc 54, with the working end of the rod 76 being spaced from the contact carrier 72 when the snap disc is disposed in its configuration of equilibrium shown in Fig. 11. When the relay is actuated and the snap disc driven to its inverted configuration as shown in broken lines, the push rod 76 is driven into engagement with the contact arm 72, separating contacts 73 and 74 to open the power circuit.

By virtue of this construction, whereby the plunger assembly is spaced from the power circuit by an air-gap at such times as the power circuit is closed, the low voltage circuit, including the coil 18, is insulated from the high voltage circuit, thereby preventing possible current leakage therebetween.

From the foregoing disclosure it will be apparent that the relay assembly may be used to perform sequential operations other than opening and closing electrical contacts without departing from the scope of the invention and that while the invention has been described with specific reference to the accompanying drawings, it is not to be limited save as defined in the appended claims.

I claim:

1. An electrical relay including a housing, a magnetic armature supported for reciprocatory movement within said housing, electromagnetic coil means for reciprocating said armature, a snap spring having two positions of equilibrium, and operative driving connections between said armature and said snap spring including a crank, a rotary ratchet wheel for revolving said crank, pawl means connected to said armature for rotating said ratchet wheel a given amount and in a given angular direction for each stroke of said armature, and connecting linkage between said crank and said snap spring for reversing the position of equilibrium thereof on alternate strokes of said armature.

2. In an electromagnetic relay adapted to be energized by a two-wire control circuit, a housing, a solenoid coil secured within said housing and connected in said two-wire control circuit, a plunger member in electromagnetic relationship with said solenoid coil and adapted to be displaced in a given direction upon energization of said coil, spring means for returning said plunger to its initial position upon deenergization of said coil, a work member supported in said housing and having at least two operative positions, a crank pin, a ratchet wheel for revolving said crank pin, pawl means driven by said plunger for rotating said ratchet wheel, a reciprocatory link joining said work member and said crank, said link being provided with an elongated slot for receiving said crank pin, said crank and link being constructed and arranged so that one revolution of the crank reciprocates said link one time to drive said work member from one operative position to the other and back, with said crank pin effecting stroke movement of said link on alternate 90° increments of revolution thereof and whereby the motion of said crank pin is in substantial alignment with the long axis of said slot during the other 90° increments of revolution thereof.

3. A relay assembly comprising a housing, a single solenoid coil disposed within said housing and adapted to be energized by a 2-wire control circuit, a plunger in electromagnetic relationship with said solenoid coil and adapted to be displaced in a given direction upon energization of said coil, spring means for returning said plunger to its initial position upon deenergization of said coil to complete one reciprocation of the plunger, a snap disc spring peripherally secured within said housing and having two positions of stable equilibrium, a crank pin, a rotatably mounted four-toothed ratchet wheel for revolving said crank pin, a connecting link between the center of said snap disc and said crank pin, a substantially rectangular slot in said connecting link for receiving said crank pin in driving relationship, a pulling pawl carried by said plunger and adapted to rotate said ratchet wheel 90° in a given direction upon the operative stroke of said plunger as caused by energization of said solenoid coil, a pushing pawl carried by said plunger and adapted to rotate said ratchet wheel 90° in said given direction by the action of said spring means in returning the plunger to its initial position after deenergization of said coil, said snap disc spring thereby to be displaced from one point of equilibrium to another upon energization of said coil and upon every second 90° increment of movement of the ratchet wheel, and work means operatively connected to said snap disc spring.

4. In a relay, in combination, coil means, a reciprocatory member in an electromagnetic relation with said coil means and adapted to be actuated thereby, a ratchet wheel assembly having a fixed axis of rotation including a first pair of diametrically opposed tooth portions, and a second pair of diametrically opposed tooth portions offset from said first pair of tooth-portions along the axis of rotation of the ratchet wheel and angularly spaced therefrom, a pulling pawl mounted to sequentially engage said first pair of tooth portions to rotate the ratchet wheel assembly in a given direction, a pushing pawl laterally offset from said pulling pawl along the axis of rotation of said ratchet wheel and adapted to engage the second pair of tooth portions in the opposite side of the axis of rotation of the ratchet wheel assembly to rotate the ratchet wheel assembly in said given direction, means connecting said pawls to said reciprocatory member to be reciprocated in unison therewith and in the same directions at the same times, and electrical contact means operatively connected to said ratchet wheel.

5. In a relay, in combination coil means, a reciprocatory member in electromagnetic relation to said coil and adapted to be reciprocated thereby, a ratchet wheel assembly having a fixed axis of rotation including a pair of mutually perpendicular legs centrally mounted on said axis of rotation and defining the plane of rotation of the ratchet wheel, said legs being laterally spaced along said axis of rotation, a pulling pawl operatively connected to said reciprocatory member leg and adapted to sequentially engage the end portions of one leg of said ratchet wheel assembly to rotate the wheel upon movement of the reciprocatory member in one direction, a pushing pawl mounted to be reciprocated by said member to engage the other of said legs upon movement of the reciprocatory member in the opposite direction, said second pawl adapted to engage a ratchet wheel at the opposite side of the center of rotation from the line of engagement of the first pawl with the wheel, thereby to rotate the wheel in the same angular direction as the first pawl, a snap disc spring having two configurations of equilibrium, operative driving connections between said ratchet wheel and said snap spring whereby change in the configuration of the latter is initiated by rotation of the wheel, and electrical contact means operatively connected to said snap spring to be opened and closed thereby.

6. In a relay, in combination coil means, a reciprocatory member in electromagnetic relation to said coil and adapted to be reciprocated thereby, a ratchet wheel assembly having a fixed axis of rotation including a pair of mutually perpendicular legs centrally mounted on said axis of rotation and defining the plane of rotation of the ratchet wheel, said legs being laterally spaced along said axis of rotation, a pulling pawl operatively connected to said reciprocatory member leg and adapted to sequentially engage the end portions of one leg of said ratchet wheel assembly to rotate the wheel upon movement of the reciprocatory member in one direction, a pushing pawl mounted to be reciprocated by said member to engage the other of said legs upon movement of the reciprocatory member in the opposite direction, said second pawl adapted to engage a ratchet wheel at the opposite side of the center of rotation from the line of engagement of the first pawl with the wheel, thereby to rotate the wheel in the same angular direction as the first pawl, a snap spring disc having two configurations of equilibrium, a crank pin mounted on said ratchet wheel, a connecting link between said crank pin and said snap spring disc for initiating snapping of the latter between its configurations of equilibrium upon rotation of the ratchet wheel, a pair of electrical terminals associated with said relay, means providing a normally closed electrical circuit between said terminals including a pair of separable electrical contacts and a movable arm carrying one of said contacts, said arm being spring biased in the direction of the circuit-closed position, a thrust link connected to the snap spring disc and adapted upon snapping of the disc in one direction to engage and displace said movable arm to open said contacts, said actuating link being out of engagement with said arm when the said circuit is closed.

7. In a relay device, a reciprocatory driving member, a driven work member having at least first and second working positions and operative driving linkage between the driving and driven members including a crank connected to be turned by the driving member, a link connecting the crank and the driven member, said link being formed with an enlarged opening for receiving the crank to afford lost motion between movement of the crank and the link, and motion amplifying means between the link and the driven member.

8. In a relay device, a reciprocatory driving member, a driven work member having at least first and second working positions and operative driving linkage between the driving and driven members including a crank connected to be turned by the driving member, a link connecting the crank and the driven member, a snap spring member having two configurations of equilibrium, said snap spring member being interposed between the said link and the driven member and adapted to partake of snap movement between its configurations when initiated by motion of said crank as applied through the link, the motion of said crank in directions for initiating snapping of the spring member being substantially less than the travel of the latter, and means affording a lost motion connection between the crank and the link to accommodate movement of the snap member exceeding that of the crank.

9. A relay device including a reciprocatory driving member, a driven work member having at least two working positions and driving linkage between the driving and driven members including a ratchet wheel, pawl means for rotating the ratchet wheel in a given direction upon motion of the driving member in one direction and pawl means for rotating the ratchet wheel in said given direction upon motion of the driving member in the other direction, and lost motion connecting means between the ratchet wheel and the driven member whereby alternate strokes of the driving member and corresponding rotation of the ratchet wheel are ineffective to operate the driven member.

JOHN B. CATALDO.

REFERENCES CITED

The following references are of record in the file of this patent:

UNITED STATES PATENTS

| Number | Name | Date |
|---|---|---|
| 594,744 | Kennedy | Nov. 30, 1897 |
| 645,684 | Hewlett | Mar. 20, 1900 |
| 847,165 | Cowles | Mar. 12, 1907 |
| 1,130,320 | Morrison | Mar. 2, 1915 |
| 1,353,539 | Palmer | Sept. 21, 1920 |
| 1,743,478 | Pratt | Jan. 14, 1930 |
| 2,324,844 | Hutt | July 20, 1943 |
| 2,399,530 | York et al. | Apr. 30, 1946 |
| 2,416,358 | Stilwell, Jr. | Feb. 25, 1947 |

Feb. 3, 1953 W. A. THOMAS 2,627,563
ELECTRIC CIRCUIT BREAKER
Filed Aug. 16, 1950 2 SHEETS—SHEET 1
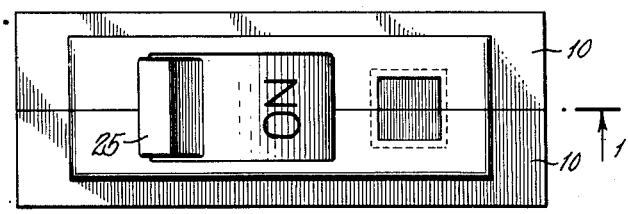
Fig. 2.
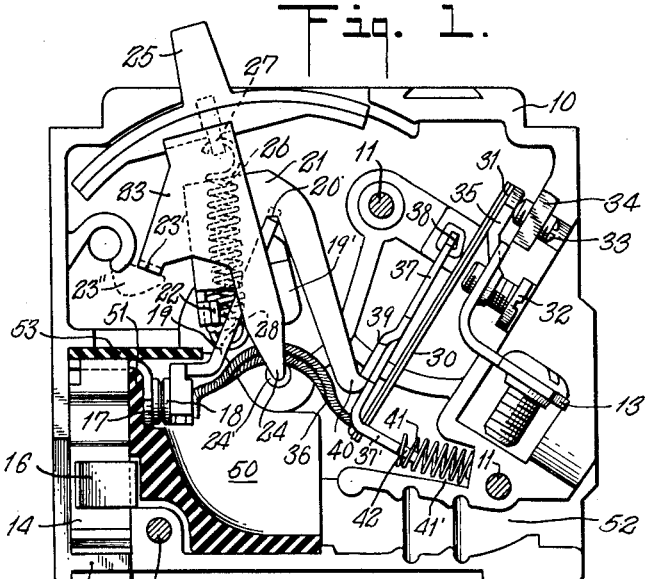
Fig. 1.
Fig. 3.
Fig. 4.
Fig. 5.
INVENTOR.
WILLIAM A. THOMAS
BY
ATTORNEY